(12) United States Patent
Arnold

(10) Patent No.: US 6,539,002 B1
(45) Date of Patent: *Mar. 25, 2003

(54) PROCESS FOR TRANSMITTING DATA

(75) Inventor: Jörg Arnold, Heidelberg (DE)

(73) Assignee: IP2H AG, Bern (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/180,708

(22) PCT Filed: May 14, 1997

(86) PCT No.: PCT/DE97/00971

§ 371 (c)(1),
(2), (4) Date: Nov. 13, 1998

(87) PCT Pub. No.: WO97/43841

PCT Pub. Date: Nov. 20, 1997

(30) Foreign Application Priority Data

May 14, 1996 (DE) ......................... 149 19 389

(51) Int. Cl.⁷ ............... H04L 1/08; H04B 7/208
(52) U.S. Cl. ............ 370/295; 370/319; 455/16
(58) Field of Search ............... 370/319, 321, 370/330, 340, 341, 343, 344, 201, 205, 206, 207, 208, 210, 469, 295; 455/16, 11.1, 12.1, 13.1

(56) References Cited

U.S. PATENT DOCUMENTS

| | | | | |
|---|---|---|---|---|
| 5,781,540 A | * | 7/1998 | Malcolm et al. | 370/321 |
| 5,790,527 A | * | 8/1998 | Janky et al. | 370/330 |
| 5,812,539 A | * | 9/1998 | Dent | 370/321 |
| 5,850,390 A | * | 12/1998 | Ramel | 370/330 |

FOREIGN PATENT DOCUMENTS

| | | |
|---|---|---|
| EP | 0 464 014 | 1/1992 |
| EP | 0 663 785 | 7/1995 |
| WO | WO9222158 | 12/1992 |
| WO | WO9501682 | 1/1995 |

* cited by examiner

Primary Examiner—Steven Nguyen
Assistant Examiner—Duc Duong
(74) Attorney, Agent, or Firm—Alston & Bird LLP

(57) ABSTRACT

This invention concerns a process for transmission of data in the form of digitally encoded radio signals, where the radio signals are comprised of both a data portion and a protocol portion. This process for achieving high quality data transmission is characterized by the fact that the transmission of the data part is started before, during, or simultaneously with the processing of the protocol portion in a transmission relay.

26 Claims, No Drawings

PROCESS FOR TRANSMITTING DATA

FIELD OF THE INVENTION

The invention relates to a process for transmitting data in the form of digitally encoded radio signals, wherein the radio signals comprise a protocol part in addition to the useful information part.

BACKGROUND OF THE INVENTION

Processes of the type under discussion have been known for many years in practice. These known processes are applied, for example in C, D1, D2 and E-plus mobile radio networks. The mobile radio networks listed by example typically comprise fixed radio equipment and an external radio network management with respect to the exchange process for radio transmission within the mobile radio nets. The transmission process is substantially controlled by an external operator site—for example a central operational computer—controlled external to the discrete radio end devices. Thereby the mobile radio devices of the radio networks as well as also the fixed radio equipment, such as, for example, base radio stations or transmission relay stations of the individual fixed radio net cells of these radio nets are externally affected.

In the conventional transmission in the known radio networks of data in the form of digitally encoded radio signals the data to be transmitted in each transmission are acquired or received by a transmission relay and first processed within the scope of a data processing and only after this processing is transferred further or transmitted. For the processing, the radio signals comprise, in addition to the information part, a protocol part, in the form of for example a transmission protocol. Such processing can also comprise an error check and error correction of the received radio signals.

In particular, in the case of long radio paths, many transmission relays are required for the transmission of the data. At each transmission relay, subsequently a processing of the radio signals in terms of protocol takes place. The transmission rate or the transmission period of the radio signals is thus determined by the sum of the processing times in the individual relays. The pure radio signal propagation velocity or radio signal group delay time, relative to the processing time, assumes markedly lower importance. In many applications of the data transmission, in particular during voice transmission, such relay-dependent transmission delays are highly unfavorable regarding transmission quality.

SUMMARY OF THE INVENTION

The present invention is therefore based on the task of specifying a process of the above described type according to which high-quality data transmission is made possible.

Accordingly, the process under discussion is implemented such that the transmission of the information part is started before, during or concurrently with the processing of the protocol part in a transmission relay.

It was found in the manner according to the invention that a change of the prior known sequence of first protocol processing and subsequently data transmission results in considerable time gain in the transmission of data in the form of digitally encoded radio signals. For this purpose the transmission of the information part is already started before, during or also concurrently with the processing of the protocol part in a transmission relay. The time gain resulting from the choice according to the invention of the sequence of information part transmission and protocol part processing in the transmission of data, in particular in voice transmission, leads to a marked quality improvement. With the correspondingly faster transmission of the radio signal subsequently through a transmission relay, the transmission duration is reduced towards pure radio signal propagation time.

DETAILED DESCRIPTION OF THE INVENTION

The process according to the invention is not only applied within the known mobile radio networks with central radio net management but also in decentral relay radio nets, for example in the decentral relay radio net described in the German Patent Application 195 35 021.9, which comprises discrete mobile radio end devices and mobile radio relays, wherein the mobile radio end devices also serve as mobile radio relays and conversely. For carrying out the process the mobile radio end devices or mobile radio relays comprise electronic processors and memories by which the end subscriber interface behavior and the relay behavior of these devices is controlled.

In view of a rapid data transmission it is especially advantageous if the radio connection required for the transmission of the data is already established before the transmission. Thereby a separation between the establishment of the radio connection and the data transmission proper is realized. The transmission process can thus take place without a time delay due to the establishment of a connection.

The data processing required in conventional processes for the identification and addressing of data to be transmitted is carried out by reading the send protocol data which is contained by the data packet to be transmitted. These data are exclusively time encoded in conventional transmission processes. The type and manner of the time sequence and of the time progression of the digital pulse yields the writing or the data.

In view of an especially simple transmission of the information part before, during or concurrently with the processing of the protocol part, in addition to a time coding, a frequency coding of the radio signal could take place. The frequency coding could therein be used for the identification of addressing of the data to be transmitted. This protocol part comprising the identification and addressing of the data to be transmitted could be transmitted especially simply substantially concurrently with the information part. The transmission of the radio signals through a transmission relay could thereby take place at nearly the pure radio propagation speed since the discrete transmission relays for the identification and addressing of the information to be transmitted only need to check and process a frequency code and do not need to perform complete protocol processing. A complete protocol processing would slow down the transmission significantly.

In especially advantageous manner, the data could be coded in frequency tuple from individual frequencies. The frequency tuple could therein be n-tuple.

Depending on the requirements, discrete frequencies of the frequency tuple can be equal to zero and/or can be equal to two or several frequencies within the frequency tuple.

As frequencies, in an especially simple manner, the radio carrier frequencies can be used for the radio signals.

During unsynchronized operation of the transmission relays—for example within the scope of the radio connection establishment or radio path establishment—the relay delay, in particular when using a large number of relays, causes the substantial part of the signal transmission time within the scope of the signal transmission. Through the process according to the invention—a "First Talk Then Think"—F3T process—the resulting total group time delay of the radio signals can be reduced to nearly the pure radio signal propagation time. Each relay transmits again the incoming received data packet simultaneously with a phase shift and carries out a required signal processing, respectively within the scope of the transmission protocol processing and transfer of the error check and error correction, after the data packet transmission.

To avoid crosstalk in the region of the transmission relays, the coding and/or the coding form, respectively the modulation process and/or the keying process of the radio carrier frequency or frequencies, can be changed during the duration of a radio connection in different radio connection phases. Thus the capability would be given, depending on the requirement, to alternate between amplitude modulation and frequency modulation or keying. The change of coding could substantially involve the frequency coding. In the transmission relay then for example different transmission oscillators are run mutually on given frequency channels in an idle status. These are electronically switched-through through the receiving power from the incoming digital radio signal directly to the relay transmitting antenna and, depending on the modulation process, keyed correspondingly. The signals transmitted simultaneously are therein transposed in terms of frequency.

To avoid an expensive and complex error checking and error correction, the transmission of the data can take place bitwise such that it is not prone to interferences. To each data bit a frequency tuple can be assigned. After its integration in the transmission relay the data bit could be transposed in terms of frequency or shifted by keying and could be transferred further without delay. Furthermore, the frequency coding or the frequency code could herein also be used for identification and addressing of the data. Moreover, use of the frequency coding or of the frequency code for identification of the transmission channel would be conceivable. The frequency coding or the frequency code could further also be used for encrypting the data to be transmitted.

In spite of the direct transmission, still a given signal interference is obtained in view of noise elimination. If the switching-through is carried out after a time integration process which is adapted to the individual pulse duration of the digital radio signals, shorter interference peaks in the radio signal can be discriminated. In this case, they do not cause an error signal transmission.

In the above direct transmission mode for the data transmission proper only defined and directly addressed target transmission relays in the switched signal radio path are operated in F3T mode. End subscribers of the radio connections are not operated in F3T mode. The radio signals can then be internally processed after the completed direct transmission of the acquired radio signals. Upon recognition of non-ignorable errors, the transmission of the signal, after having been freed of errors, can be carried out anew.

Through the repeated transmission, an increase of radio activity may occur in the radio network during operation in F3T mode, since initially error radio signals are transferred further and subsequently—after error correction—additionally signals, freed of errors, are sent. In addition, the unsynchronized relays, which are operated in F3T mode, are also transmitting radio signals which are not part of the radio traffic defined through the existing radio path, potentially unchecked. Thereby radio signals, external to the radio connection, of other radio connections can potentially crosstalk into the established radio connection.

As already stated, the end subscriber never operates in F3T mode. Therefore the crosstalk is insignificant for the data transmission proper between the end subscribers of a radio connection since the end subscribers within the scope of protocol processing check the target address of the digital radio code sequence of the data packet transmitted.

However, crosstalk increases the radio loading and therefore involves the radio net capacity and the radio collision problematic [issues] in the radio net and therefore is to be avoided.

The data coded in frequency tuple could to this end be expected in coincidence in the receiver relay in predetermined frequency channels or at specific time intervals and thus quasi open the radio connection doors in the established radio connection under consideration. Multifrequency processes served until now for transmitting digitally encoded data such as for example the frequency shift keying exclusively for suppressing interference effects on the radio signals.

Stated more precisely, the individual frequency pulses of the frequency tuples for avoiding crosstalk could be expected or received in a predeterminable time sequence within predeterminable time windows in the transmission relay and/or in the data receiver. Analogously, the individual frequency pulses of the frequency tuple could be expected or received in coincidence in a predeterminable time range in the transmission relay and/or the data receiver. Thereby the relay would to some extent be synchronized ("slotted F3T process").

During the radio acquisition procedure specific time windows under the relays would be agreed in which they operate exclusively in F3T mode. External data packets from other contacting radio paths potentially fall outside the transmission time window of the F3T mode. They are subsequently first checked and, if appropriate, not transferred further.

A common synchronization clock could be made possible through a uniform time standard which all relays can receive via, for example, internal radio clocks. An error synchronization in this case slows only the signal transmission since the radio signals to be transmitted are then first checked by the relay and only subsequently transmitted.

Another or else further possibility of protection against crosstalk in F3T mode could be realized thereby that the transmission relay(s) selected for a specific radio connection and/or the data receiver expects or receives, respectively, the arrival of the frequency coded data in predetermined or presettable receiving frequency channels. The expected frequency tuple, respectively the expected values with respect to the frequencies of the frequency tuple of the radio signals, can be alternated for a renewed reception within the course of the radio signal transmission according to a presettable process. Analogously, the frequencies of the frequency tuple could be alternated according to a presettable process. Therein, on the one hand, the receiving end, and, on the other hand, the transmitting end is considered.

An especially effective alternating process is a cyclic process. This could be attained through a so-called frequency jump cycle process in which one relay responds only to incoming radio signals whose signal pulses are carried by a highly specific expected consecutive frequency. The transmission frequency, which can be initially of any frequency, is alternated in the continued radio traffic through the defined cyclic process.

For this purpose the alternating process could be carried out according to a frequency table associated with the relays and the data receiver. Such a table could be applied to the relays and/or the data receiver via a microprocessor.

Depending on the requirements, the alternating process could be identical for each transmission relay of a presettable number of transmission relays or a specific group of transmission relays. Alternatively, the frequency selection cycle could also be identical in all relays. If a relay has received an initial radio transmission with a specific radio frequency, it expects the next transmission from this transmission direction with a highly specific radio frequency in accordance with the cycle, potentially given in the form of tables. The cyclic process determines in the further sequence of the radio traffic the entire radio frequency combination in the entire radio path for both transmission directions available, i.e. from the transmitter to the receiver and conversely. This combination is changed deterministically in every subsequent transmission in the radio connection.

Furthermore, the predetermined frequency tuple for each relay of a specific number of relays or a specific group of relays can originate from another frequency tuple selection process or another cycle range or cycle segment of the frequency tuple selection process. The relays which pass on the received data could pass on the received radio signals with alternating frequency tuples. Herein, in an especially simple manner, the alternating process of the frequency tuples could be identical for transmitting and for receiving for the corresponding relay groups.

The instantaneous probability w (relay crosstalk probability) that a relay is impinged by a radio signal with the expected radio frequency which does not originate from the radio connection under consideration, decreases at a fixed radio activity under a transmission power adaptation with $$w = n^+/m^2$$

where m is the number of radio frequency channels used of the utilized transmission band and $n^+$ the number of the nearest neighbors which can transmit. This is the probability with which two dice players with a dice with m eyes both throw the same number.

Further reduction of this probability can be attained through a two-frequency process or a Multifrequency process. Here, the relay is sensitized to a radio frequency pair or frequency tuple. This can be applied simply with a frequency modulation or frequency shift keying of the radio signals. The demodulation of the radio signals could take place within the scope of a coincidence demodulation. In the case of sensitization to a radio frequency pair, the radio frequencies used could be paired arbitrarily or deterministically in the send transmission from the available radio frequencies of the radio channels. The upper limit of the instantaneous probability $W_2$ for the crosstalk of radio connection is:

$$W_2 = 3np \ (2/m(m-1))^2$$

where m is the number of available radio frequency channels, n the number of relays in the radio path and p the number of parallel transmission possibilities of a relay. The model of a Cartesian grid was used.

The crosstalk through radio call-ups from radio contact establishments for generating the radio connection proper can be avoided through a further modulation distinction. The radio contact establishment, which, as stated earlier, does not take place in F3T mode, is carried out by means of amplitude-modulated or amplitude-keyed signals. This corresponds to a frequency modulation or frequency shift keying of frequency pairs with a frequency v=0. Such frequency pairs are ignored in F3T mode by the relays due to the coincidence demodulation and therefore cannot crosstalk.

Thus, crosstalk is only possible in the case of offered, crossing or contacting radio paths, which at the point of intersection operate locally at the same frequency tuple of the frequency selection cycle. With m=256 duplex frequency channels and 100 repeating stations in the radio path and 4 parallel transmission capabilities of each individual relay, at a transmitting power adaptation the crosstalk probability for a radio connection in modulation-distinguished, cyclic F3T mode is less than $W_2 = 1.1 \times 10^{-6}$.

The above cited amplitude keying within the scope of the radio contact establishment has the further advantage of energy saving in the radio relays, since here only for positive data bits of the digital radio signals transmission power is generated. The data packets in the offered radio connections can, on the other hand, be transmitted with the frequency modulation which is significantly not prone to interferences.

In radio path optimization, for example at a decrease or increase of the repeating station number, the frequency cycle must be adapted again. The individual relays can orient themselves along a transmitted variable in the radio protocol which specifies the frequency tuple selection for the next data packet.

It is essential in the process according to the invention that the transmission relays transmit the usable data or the information part for the data receiver separate in time of the associated transmission or control protocols or control instructions. Herein, in particular, a data processing such as for example a target address change or an error check or correction of the data to be transmitted could be carried out in the transmission relays separate in time from the transmission of the data.

In view of an especially simple and effective error check or error correction, the transmission of the data in each transmission direction could be monitored or checked by the preceding transmission relays in reciprocal radio contact and, upon the occurrence of an error, could be corrected. A more precise description of such error checking is provided within the scope of the description of an embodiment example of the process according to the invention.

The process according to the invention minimizes the relay delays in a radio relay net to such minimum time lengths that several 100 relays can be interconnected in a radio connection in a radio relay net. Thereby large relay radio nets, covering an extensive area, for telecommunication purposes are made possible, in which data transmission with at least an equally high transmission rate are achieved as are realized in previous cable networks or fiber optics networks.

For a better understanding of the process according to the invention for the transmission of data in the form of digitally encoded radio signals, in the following the process will be explained in detail in conjunction with an embodiment example:

The process according to the invention is a fast and interference-free transmission process of useful information within a radio connection or within a radio connection chain of potentially a high number of transmission relays. Establishing the radio connection (routing) is not subject matter of the invention and the following description. The radio connection is assumed as being closed and existing.

In the case of multiple transmission via radio relays, the following problems and requirements exist:

1. Each relay generates a time delay in a transmission process referred to as relay hop, which must be minimized in order to be able to carry out real-time transmissions such as, for example, voice transmissions.
2. Transmission errors caused by interferences in the radio transmission accumulate strongly in a multiple transmission. These transmission errors must be avoided or corrected.

These problems of a multiple transmission or a multihop transmission are all solved through the invention.

To minimize the relay transmission or relay response time, the time-consuming intermediate storage of long transmitted data sets (strings) and the internal error analysis and error correction before the transmission proper of the data must be omitted. This is supported by a single-pulse or single-bit transmission within the scope of digital data transmission. The intermediate storage expenditures in that case is extremely minimal since it only comprises one transmitted radio pulse. Consequently, in the transmission via the relay an error analysis and error correction can be omitted.

The single-pulse transmission is comprising various further advantages. A single bit to be transmitted can not be deleted by radio signal interference during transmission. This is standing in contrast to data strings, which comprise a great number of radio transmitter pulses and show a complex pulse pattern. Such a pattern can be substantially deformed and disturbed by interference.

The single bit transmission avoids, furthermore, the superimposition interference which is caused by a multipath propagation with group delay time differences. If, according to agreement, only one radio transmitting pulse is transmitted as data unit, further identical pulses, which arrive in the same reception channel and originate from other radio connections or from a multipath propagation of the same radio connection, can be ignored. In the conventional transmission, data strings which are superimposed offset in time can not be resolved even without interference phenomena and in that case supply error data.

An error transmission, further, is avoided thereby that each transmission relay which has sent a digital data bit checks the retransmission of the data content of this bit through the succeeding transmission relay. This is possible since the two involved transmission relays are in mutual radio range.

If an error is generated by a succeeding transmission relay and is retransmitted, this error can be detected by the monitoring first transmission relay and be marked by a following error bit transmitted after it which is also retransmitted. The succeeding transmission relay can then detect errors or bits which are followed by an error bit, as being errors and can ignore them. This process rules out an error transmission and an error accumulation within the radio connection chain via the transmission relays.

To solve the problematic [issues] described under 1. and 2. thus a single-bit transmission is used. However, individual identical radio transmitter pulses, which are all sent on the same carrier frequency, cannot cause any data distinction in a digital data transmission. For a data distinction within the data transmission, further characteristics of the radio transmitter pulses must be drawn on in order to be able to represent distinguished data bits, for example binary data bits and control bits, error bits, dummy bits, synchronization bits etc.

This could take place through a different pulse form, for example with respect to pulse height or pulse width of radio transmitter pulses or radio transmitter pulse groups. As an example, here the Morse radio transmission with pulse sequences of long and short pulses for individual data symbols is known.

Furthermore, for this purpose the absolute or relative time position of identical radio transmitter pulses with respect to a time event is used such as, for example, a synchronization pulse of a preceding radio transmitted pulse or preceding pulse groups. As an example the simple binary pulse code modulation transmission is known.

Lastly, for this purpose also a carrier frequency distinction of the radio transmitter pulses could be selected. Herein different digital data bits are characterized by different radio frequencies or frequency phase positions of the radio transmitter pulses. As an example for that is known the telephone dual tone multi-frequency signaling.

But in all known applications of the above described process time pulse sequences (strings) with at least two or more single pulses sequential in time are always used at a specific time interval as data unit, for example as logic binary bit. Since several radio transmitter pulses form one data unit, they must be distinguished in time for the distinction of other units. This takes place through a synchronization, thus, through a specific time relationship to a time event, such as, for example, to a specific radio transmitter pulse or a radio transmitter pulse group or, respectively, to a data bit (synchronization bit).

In contrast, in the invention, in fact, individual radio transmitter pulses are used as a complete data unit or as a logic data bit, whose absolute time position within a radio transmitter pulse group or bit group has no significance for the data transmission. Any synchronization of the radio transmitter pulses are herein omitted.

The data distinction or bit distinction takes place within the data transmission through a difference code within the scope of a frequency coding. Each transmission relay comprises for this purpose a stored carrier frequency table and a stored frequency selection process. Both the table with a defined sequence of the various carrier frequencies to be used as well as also the selection rules according to which a transmission frequency is selected from this table and used, are all impressed on all transmission relays of a specific group of transmission relays in the same way.

The technical realization therein takes place via the application of electronic stores and microprocessors in the transmission relays in which the required frequency table and the selection process are changeably and programmably stored and in which the processing or the selection is being carried out.

During multiple transmission from transmission relay to transmission relay a radio signal pulse to be transmitted, after the radio reception in the relay, must be transposed in terms of frequency in order to be able to be retransmitted immediately or simultaneously. The frequency transposition prevents that the potentially high transmitter output power of the transmitter output stage of the relay crosstalks onto the potentially still (simultaneous) open sensitive receiving input stage of the same frequency channel and overdrives it or possibly even destroys it.

The logic data in this frequency conversion are immediately transmitted in that from the transmitter highly specific frequencies starting from a start signal frequency agreed upon between the transmission relays, for the different data bits are selected.

To illustrate the frequency conversion, reference is made to the table added at the end of the description.

The transmission of useful data starts with the transmission of the start transmitter pulse tuple from three specific carrier frequencies. These carrier frequencies are always alternated randomly or deterministically in the transmission from relay to relay. The carrier frequencies of the start signal serve simultaneously each transmission relay in order to define a home position on its frequency table for the further transmission. Each transmission relay as well as the source transmitter and the target receiver also register the start signal transferred further by its target transmission relay. They can therefore check the radio transmission of their target transmission relays in its further progression.

A transmission relay which has received and passed on its start signal, now waits for the transmission of the useful data. It expects one of different possible radio transmitter pulses comprising or predetermined carrier frequency. It is only for these predetermined radio signals that it holds open the specific radio receiving channels. The number of possible radio signals of different frequency corresponds to the number of the different data bits required for the data transmission. If, for example, for the data transmission two binary logic bits and one control bit are required, three different carrier frequencies are used for the radio transmitter pulses.

The transmission relay now receives the first useful data bit in one of its predetermined receiving channels with the specific transmitter frequencies. Which receiving channels it holds open it defines according to the specific selection rule, for example the specific selection process. This selection rule is known to every participating radio net subscriber. It is implemented in programmable form in the transmission relays through the stated memories and microprocessors.

The selection rule, respectively the example, could be the following. Only those input channels are to be kept open for reception whose reception frequencies are disposed on the implemented frequency table two, three and seven positions from the home position counting in a specific direction. If a signal is received in the receiving channel with the frequency position −2, a data bit "logic 0" is present. If reception takes place in frequency position 3, a data bit "logic 1" is present and if reception takes place in position 7, the "control bit" is present.

The transmission relay can assign the radio signal received thus to a data bit and can transfer this further. It recognizes the transmission process and sends a radio signal whose frequency it has transposed by as many positions on the internal frequency table as has been determined by the selection rule defined in the table for the data bit to be transmitted. As the home position for the frequency transposition, it uses the position of the radio signals retransmitted last by it. The next receiver of the radio signal expects this signal again in the three possible continuously counted frequency position, starting from the position of its last received receiving signal.

This process, of encrypting or reconstructing the data of a transmitter pulse or a receiving pulse through difference positions of the carrier frequencies in a frequency table, can simultaneously be used as an encryption process per se. The advantage herein is that the frequency transposition is highly favorable from the aspect of radio technology, as described. Through the frequency transposition process in simple manner a sufficient encryption of the transmission data can be attained without having to perform additional process steps for encryption. This reduces considerably the hardware expenditures in the realization of the transmission process.

As long as the frequency table and the position shift rules are not known to third parties, no information about the encryption can be gained from the pure radio reception. All data bits used occur in the radio transmission absolutely symmetrically, i.e. it is not possible to detect which data bits are present since a cyclic run through the frequency table takes place and for different data bits sequentially radio transmitter pulses of identical frequency and identical type may occur.

Even if the text of the transmission should be known, it is not possible to assign the radio transmitter pulses in their time transmission sequence to the text letters since no fixable relation between the number of the text characters and the number of the radio transmitter pulses needs to be given. This can be attained thereby that a transmission relay after the transmission of a data bit through stochastic decision succeeds this bit with a "dummy bit", which in terms of information is meaningless yet regular, or transmits the next data bit. In this respect, error bits have the same encrypted effect as do dummy bits.

In a radio relay network potentially a large number of relays and considerable telecommunication traffic must be expected in the proximity of a target relay. Since for each radio connection always piecewise between two relays in the forward as well as also in the return direction at least two different radio frequency channels are agreed, this can lead to a high requirement of frequency channels or frequency bandwidth.

Added to this is that all relays in a given proximity can, independently of one another, agree on the frequency channels to use. Consequently, the danger exists that in two independent radio connections which are spatially very close, the same frequency channels are used. This can lead to crosstalk between the two radio connections.

In order to suppress this same-channel interference, the frequency channel raster must be spread as much as possible so that the probability for same-channel interferences is minimized. This is attained thereby that between two relays, in fact, several radio transmitter pulses with different frequencies are exchanged as a data bit. Depending on the number used, these radio frequencies form radio frequency tuples. A relay therefore expects not the arrival of a specific radio transmitter single pulse but rather a tuple of radio transmitter pulses with different carrier frequencies.

The discrete radio transmitter pulses of a frequency tuple can be sent simultaneously or at a specific time interval. The receiver expects, conversely, the single pulses in coincidence in time or at a specific time interval. Through this coincidence demodulation the crosstalk between radio connection can be largely suppressed since a large number of frequency combinations or different frequency tuples can be generated.

The necessary number of orthogonal single frequencies, which are required for a high and increasing interference suppression in the radio net, increases less strongly so that the necessary number of frequency channels or frequency bandwidth for the transmission in the radio net can be kept relatively restricted. The number of required frequency channels and the rank of the frequency tuples as well as the radio transmitter pulse duration and the time windows used of the coincidence demodulation can be determined and optimized in computer simulations for a radio network.

In summary may be mentioned that in the described transmission process in the application for the first time a frequency-parallel transmission of discrete data bits with a coincidence demodulation is applied at the receiver with which the distinguished bit data is defined through position differences in frequency tuple tables with the aid of specific selection processes. The frequency tables as well as also the selection process are programmably implemented in each radio net relay. This transmission process ensures data transmission in multi-relay radio networks at maximum speed and with high interference security. The radio signals within the scope of their frequency coding in frequency tuples comprise an information part as well as also a protocol part wherein the protocol part is responsible for the correct transmission of the logic data bits 0 or 1 within the scope of the start signal in cooperation with the frequency table.

| | | TRANSMITTER | | | | RELAY | | | | | | RELAY OR RECEIVER | | | | |
|---|---|---|---|---|---|---|---|---|---|---|---|---|---|---|---|---|
| 0 | → | bronce | orange | yellow | → | bronce | orange | yellow | — | — | — | — | bronce | orange | yellow | | |
| | Δ = −2 | white | lilac | brown | | white | lilac | brown | | | | | white | lilac | brown | | |
| START | → | red | pink | orange | → | red | pink | orange | — | — | — | | red | pink | orange | | |
| | | green | black | pink | | green | black | pink | | | | | green | black | pink | | |
| | Δ = 3 | yellow | turqaise | turqaise | | yellow | turqaise | turqaise | | | | → | yellow | turqaise | turqaise | | |
| 1 | → | blue | gold | silver | → | blue | gold | silver | — | — | | | blue | gold | silver | | |
| | Δ = 7 | brown | silver | grey | | brown | silver | grey | | | — | → | brown | silver | grey | → | START |
| | | orange | bronce | transparent | | orange | bronce | transparent | | | | | orange | bronce | trans-parent | | |
| | | lilac | grey | white | | lilac | grey | white | | | | | lilac | grey | white | Δ = 3 | |
| ERROR | → | pink | blond | green | | pink | blond | green | | — | — | → | pink | blond | green | → | 1 |
| | | black | trans-parent | red | | black | trans-parent | red | | | | | black | trans-parent | red | | |
| | | turqaise | white | blue | | turqaise | white | blue | | | | | turqaise | white | blue | | |
| | | gold | red | lilac | | gold | red | lilac | | | | | gold | red | lilac | | |
| | | grey | green | black | | grey | green | black | | | | | grey | green | black | | |
| | | silver | yellow | gold | | silver | yellow | gold | | | | | silver | yellow | gold | | |
| | | blond | blue | bronce | | blond | blue | bronce | | | | | blond | blue | bronce | | |
| | | transparent | brown | blond | | transparent | brown | blond | | | | | transparent | brown | blond | | |

What is claimed is:

1. A process for transmitting data comprising the steps of:
    receiving a digitally encoded radio signal within a radio net with the aid of at least one transmission relay, wherein the data has an information part and a protocol part;
    processing the protocol part of the radio signal within the transmission relay; and
    starting a transmission of the information part of the radio signal before, during or concurrently with the processing of the protocol part of the radio signal; and
    wherein the transmission of the data takes place bitwise and each data bit is assigned a frequency tuple.

2. Process as claimed in claim 1 further comprises establishing radio connection between required transmission relays for transmitting the data before transmitting the data.

3. Process as claimed in claim 1, wherein each data bit is assigned a frequency tuple having n-tuples.

4. Process as claimed claim 1, wherein each data bit is assigned a frequency tuple, and wherein at least one of the frequencies of the frequency tuple is equal to zero.

5. Process as claimed in claim 1, wherein each data bit is assigned a frequency tuple, and wherein two or more frequencies within the frequency tuple are identical.

6. Process as claimed in claim 1, wherein the frequency tuple defines different radio carrier frequencies, and wherein the data is transmitted in the carrier energy of the radio signals.

7. Process as claimed in claim 6, wherein at least one of the radio carrier frequencies can be coded, and wherein the code for the carrier frequency can be changed during the duration of a radio connection in different radio connection phases.

8. Process as claimed in claim 7, wherein the change of the coding of a carrier frequency is in reference to a selected frequency coding.

9. Process as claimed in claim 1, wherein each data bit after being received by a transmission relay is transposed in terms of frequency and is immediately retransmitted.

10. Process as claimed in claim 7, wherein the frequency coding is used for identification and addressing of the data.

11. Process as claimed in claim 7, wherein the frequency coding is used for identification of a transmission channel.

12. Process as claimed in claim 7, wherein the frequency coding is used for encryption of the data to be transmitted.

13. Process as claimed in claim 1, wherein the frequency tuple defines discrete frequency pulses, and wherein these discrete frequency pulses are expected in a presettable time sequence within presettable time windows in the transmission relay.

14. Process as claimed in claim 1, wherein the frequency tuple defines discrete frequency pulses, and wherein these discrete frequency pulses are expected in coincidence in a presettable time range at the transmission relay.

15. Process as claimed in claim 1, wherein the transmission relays selected for a specific radio connection expect the arrival of the data in presettable receiving frequency channels.

16. Process as claimed in claim 1, wherein the frequency tuple of the radio signals is alternated for a renewed reception in the course of the radio signal transmission according to a presettable process.

17. Process as claimed in claim 1, wherein the frequency tuple defines discrete frequencies, and wherein these discrete frequencies are alternated according to a presettable process.

18. Process as claimed in claim 16, wherein the frequency tuple is alternated according to a cyclic process.

19. Process as claimed in claim 16, wherein the frequency tuple is alternated according to a frequency table assigned to the transmission relays.

20. Process as claimed in claim 16, wherein the frequency tuple is alternated by the same process for each transmission relay of a specific group of transmission relays.

21. Process as claimed in claim 16, wherein the frequency tuples for each transmission relay of a specific group of relays originate from another frequency tuple selection process.

22. Process as claimed in claim 16, wherein at least one of the transmission relays resends data received by the transmitter relay with an alternated frequency tuple.

23. Process as claimed in claim 16, wherein the transmission relays are grouped into selected relay groups, and wherein the frequency tuple for each radio signal is alternated by the same process in each transmission relay for at least two of the relay groups.

24. Process as claimed in claim 1, wherein the transmission relays transmit the information part of the data separate in time from the associated transmission of control protocols.

25. Process as claimed in claim 1, wherein data processing of the data to be transmitted is carried out in the transmission relays, separate in time from the transmission of the data.

26. Process as claimed in claim 1, wherein the transmission of the data from a first transmission relay to a second transmission relay is checked by the first transmission relay, and is corrected upon the occurrence of an error.

* * * * *

UNITED STATES PATENT AND TRADEMARK OFFICE
CERTIFICATE OF CORRECTION

PATENT NO.      : 6,539,002 B1
DATED           : March 25, 2003
INVENTOR(S)     : Arnold It is certified that error appears in the above-identified patent and that said Letters Patent is hereby corrected as shown below:

<u>Title page,</u>
Item [30], Foreign Application Priority Data, "149 19 389" should read
-- 196 19 389 --.

Signed and Sealed this

Nineteenth Day of August, 2003

JAMES E. ROGAN
*Director of the United States Patent and Trademark Office*